United States Patent [19]

Gomikawa

[11] Patent Number: 5,008,750
[45] Date of Patent: Apr. 16, 1991

[54] TELEVISION RECEIVER WITH TELETEXT RECEIVING FUNCTION AND METHOD OF SUPERIMPOSING TELETEXT PICTURE ON TELEVISION PICTURE

[75] Inventor: Takao Gomikawa, Saitama, Japan

[73] Assignee: Kabushiki Kaisha Toshiba, Kawasaki, Japan

[21] Appl. No.: 486,232

[22] Filed: Feb. 28, 1990

[30] Foreign Application Priority Data

Feb. 28, 1989 [JP] Japan ................................. 1-49037

[51] Int. Cl.$^5$ ............................................. H04N 7/087
[52] U.S. Cl. .................................... 358/147; 358/142; 358/183
[58] Field of Search ................ 358/142, 146, 147, 183

[56] References Cited

U.S. PATENT DOCUMENTS 4,729,028 3/1988 Micic .

FOREIGN PATENT DOCUMENTS 1246978 10/1989 Japan .
0305681 12/1989 Japan .
2217144 10/1989 United Kingdom .
2222051 2/1990 United Kingdom .

OTHER PUBLICATIONS

Television Technics & Electronics '88/vol. 36, pp. 21–25.

Primary Examiner—John W. Shepperd
Assistant Examiner—Michael D. Parker
Attorney, Agent, or Firm—Cushman, Darby & Cushman

[57] ABSTRACT

In case teletext data superimposed on a television broadcast signal are to be displayed as an auxiliary picture on a main picture on which a television video signal is displayed, the teletext data must be compressed. If the logical outputs of two pixels themselves adjacent in the horizontal direction are made data after the compression as this compressing method, depending on the contents of the teletext data, the data after the compression will not reproduce the original information in some case. In this invention, the teletext data are divided into blocks of a predetermined size and the "dense" and "rare" densities of the respective blocks are judged. The optimum compressing method losing no information is selected in response to this judging result.

10 Claims, 14 Drawing Sheets

| DATA | CONVERSION VALUE | | DATA | CONVERSION VALUE |
|---|---|---|---|---|
| 00 | FF(-1) | | F0 | FF(-1) |
| 01 | FF(-1) | | F1 | FF(-1) |
| 02 | FF(-1) | | F2 | FF(-1) |
| 03 | FF(-1) | | F3 | FF(-1) |
| 04 | FF(-1) | | F4 | 01(+1) |
| 05 | FF(-1) | | F5 | 01(+1) |
| 06 | FF(-1) | OMITTED | F6 | 01(+1) |
| 07 | FF(-1) | | F7 | 01(+1) |
| 08 | FF(-1) | | F8 | 01(+1) |
| 09 | FF(-1) | | F9 | 01(+1) |
| 0A | FF(-1) | | FA | 01(+1) |
| 0B | FF(-1) | | FB | 01(+1) |
| 0C | FF(-1) | | FC | 01(+1) |
| 0D | FF(-1) | | FD | 01(+1) |
| 0E | FF(-1) | | FE | 01(+1) |
| 0F | FF(-1) | | FF | 01(+1) |

FIG.13

|   | A 1 | B 1 | A 2 | B 2 | A 3 | B 3 | A 4 | B 4 | A 5 | B 5 | A 6 | B 6 | A 7 | B 7 | A 8 | B 8 | A 9 | B 9 | A 10 | B 10 | A 11 | B 11 | A 12 | B 12 |
|---|---|---|---|---|---|---|---|---|---|---|---|---|---|---|---|---|---|---|---|---|---|---|---|---|
| 1 | | | | | | | | | | | | | | | | | | | | | | | | |
| 2 | | | *I* | | | | | | *II* | | | | | | *III* | | | | | | | | | |
| 3 | | | (10) | | | | | | (9) | | | | | | (8) | | | | | | | | | |
| 4 | | | | | | | | | | | | | | | | | | | | | | | | |
| 5 | | | | | | | | | | | | | | | | | | | | | | | | |
| 6 | | | *IV* | | | | | | *V* | | | | | | *VI* | | | | | | | | | |
| 7 | | | (3) | | | | | | (2) | | | | | | (5) | | | | | | | | | |
| 8 | | | | | | | | | | | | | | | | | | | | | | | | |
| 9 | | | | | | | | | | | | | | | | | | | | | | | | |
| 10 | | | *VII* | | | | | | *VIII* | | | | | | *IX* | | | | | | | | | |
| 11 | | | (4) | | | | | | (7) | | | | | | (5) | | | | | | | | | |
| 12 | | | | | | | | | | | | | | | | | | | | | | | | |

FIG.14

|   | A 1 | B 1 | A 2 | B 2 | A 3 | B 3 | A 4 | B 4 | A 5 | B 5 | A 6 | B 6 | A 7 | B 7 | A 8 | B 8 | A 9 | B 9 | A 10 | B 10 | A 11 | B 11 | A 12 | B 12 |
|---|---|---|---|---|---|---|---|---|---|---|---|---|---|---|---|---|---|---|---|---|---|---|---|---|
| 1 | | | | | | | | | | | | | | | | | | | | | | | | |
| 2 | | | *I* | | | | | | *II* | | | | | | *III* | | | | | | | | | |
| 3 | | | (22) | | | | | | (23) | | | | | | (24) | | | | | | | | | |
| 4 | | | | | | | | | | | | | | | | | | | | | | | | |
| 5 | | | | | | | | | | | | | | | | | | | | | | | | |
| 6 | | | *IV* | | | | | | *V* | | | | | | *VI* | | | | | | | | | |
| 7 | | | (29) | | | | | | (30) | | | | | | (27) | | | | | | | | | |
| 8 | | | | | | | | | | | | | | | | | | | | | | | | |
| 9 | | | | | | | | | | | | | | | | | | | | | | | | |
| 10 | | | *V* | | | | | | *VIII* | | | | | | *IV* | | | | | | | | | |
| 11 | | | (28) | | | | | | (25) | | | | | | (27) | | | | | | | | | |
| 12 | | | | | | | | | | | | | | | | | | | | | | | | |

FIG.15

| DATA | COMPRESSION CONVERSION VALUE | | DATA | COMPRESSION CONVERSION VALUE |
|---|---|---|---|---|
| 00 | 00 | | F0 | C0 |
| 01 | 00 | | F1 | D0 |
| 02 | 00 | | F2 | A0 |
| 03 | 10 | | F3 | D0 |
| 04 | 00 | | F4 | A0 |
| 05 | 00 | | F5 | D0 |
| 06 | 00 | OMITTED | F6 | A0 |
| 07 | 10 | | F7 | D0 |
| 08 | 00 | | F8 | A0 |
| 09 | 00 | | F9 | D0 |
| 0A | 00 | | FA | A0 |
| 0B | 10 | | FB | D0 |
| 0C | 20 | | FC | E0 |
| 0D | 20 | | FD | D0 |
| 0E | 20 | | FE | E0 |
| 0F | 30 | | FF | F0 |

FIG.17A

| DATA | COMPRESSION CONVERSION VALUE | | DATA | COMPRESSION CONVERSION VALUE |
|---|---|---|---|---|
| 00 | 00 | | F0 | 0C |
| 01 | 00 | | F1 | 0D |
| 02 | 00 | | F2 | 0A |
| 03 | 01 | | F3 | 0D |
| 04 | 00 | | F4 | 0A |
| 05 | 00 | | F5 | 0D |
| 06 | 00 | OMITTED | F6 | 0A |
| 07 | 01 | | F7 | 0D |
| 08 | 00 | | F8 | 0A |
| 09 | 00 | | F9 | 0D |
| 0A | 00 | | FA | 0A |
| 0B | 01 | | FB | 0D |
| 0C | 02 | | FC | 0E |
| 0D | 02 | | FD | 0D |
| 0E | 02 | | FE | 0E |
| 0F | 03 | | FF | 0F |

FIG.17B

| DATA | COMPRESSION CONVERSION VALUE | | DATA | COMPRESSION CONVERSION VALUE |
|---|---|---|---|---|
| 00 | 00 | | F0 | C0 |
| 01 | 10 | | F1 | D0 |
| 02 | 10 | | F2 | D0 |
| 03 | 10 | | F3 | D0 |
| 04 | 20 | | F4 | E0 |
| 05 | 30 | | F5 | F0 |
| 06 | 30 | OMITTED | F6 | F0 |
| 07 | 30 | | F7 | F0 |
| 08 | 20 | | F8 | E0 |
| 09 | 30 | | F9 | F0 |
| 0A | 30 | | FA | F0 |
| 0B | 30 | | FB | F0 |
| 0C | 20 | | FC | E0 |
| 0D | 30 | | FD | F0 |
| 0E | 30 | | FE | F0 |
| 0F | 30 | | FF | F0 |

FIG. 18A

| DATA | COMPRESSION CONVERSION VALUE | | DATA | COMPRESSION CONVERSION VALUE |
|---|---|---|---|---|
| 00 | 00 | | F0 | 0C |
| 01 | 01 | | F1 | 0D |
| 02 | 01 | | F2 | 0D |
| 03 | 01 | | F3 | 0D |
| 04 | 02 | | F4 | 0E |
| 05 | 03 | | F5 | 0F |
| 06 | 03 | OMITTED | F6 | 0F |
| 07 | 03 | | F7 | 0F |
| 08 | 02 | | F8 | 0E |
| 09 | 03 | | F9 | 0F |
| 0A | 03 | | FA | 0F |
| 0B | 03 | | FB | 0F |
| 0C | 02 | | FC | 0E |
| 0D | 03 | | FD | 0F |
| 0E | 03 | | FE | 0F |
| 0F | 03 | | FF | 0F |

FIG. 18B

TELEVISION RECEIVER WITH TELETEXT RECEIVING FUNCTION AND METHOD OF SUPERIMPOSING TELETEXT PICTURE ON TELEVISION PICTURE

BACKGROUND OF THE INVENTION

1. Field of the Invention

This invention relates to a television receiver whereby teletext data superimposed in a vertical flyback period can be received, compressed and displayed on a picture and also relates to a compressing method in the case of compressing the data.

2. Description of the Related Art

A character broadcasting system is generally known as a teletext. A teletext system is a system wherein, in a television broadcasting station, teletext data encoded in a predetermined horizontal scanning period in a vertical blanking period are superimposed and are transmitted together with a television signal. On the receiver side, the received teletext data are picked up, are decoded to the original character information and are displayed on a TV screen.

The television broadcasting station can transmit many teletext programs by utilizing a plurality of horizontal scanning periods. The user can first select a television channel broadcasting a program by such key input means as a remote controlled hand set and then designate the program number of the teletext program so as to receive the teletext program.

Now, in an ordinary TV receiver, when a teletext is to be received, the TV picture is switched to a teletext picture and, when a TV broadcast is to be received, the TV picture is switched to a TV broadcast picture. Therefore, both of the teletext and TV broadcast can not be simultaneously displayed on the picture. Therefore, as in the Japanese Patent Application No. 75363/1988 filed by the Applicant of the present case, by a two-picture displaying technique, either one of the broadcasts is displayed as a main picture and the other broadcast is displayed as an auxiliary picture.

FIG. 1 shows an example of a picture on which teletext data are displayed as an auxiliary picture. In FIG. 1, the teletext picture is displayed in the lower right corner of the TV broadcast picture (main picture) displayed over the whole picture. In the case of FIG. 1, the teletext picture occupies a quarter of the TV broadcast picture.

In the case of such display mode as is mentioned above, the teletext data must be compressed. In the compression, the size in the vertical direction of the picture is contracted to be half by subtracting the first or second field of the information displayed over the whole TV picture and the size in the horizontal direction of the picture is contracted by subtracting in the horizontal direction such pixel data.

There is such compressing method as a method of logically operating two pixel data with each other.

FIGS. 2 and 3 are explanatory views for explaining an example of the compressing method by the above mentioned logical operation. FIG. 2 shows a teletext picture before the compression. FIG. 3 shows a teletext picture after the compression.

As shown in FIG. 2, the teletext data are to be displayed on a TV screen in which 12 rasters and 24 pixels in the horizontal direction are arranged. The contents of the data are exemplified by "H", "F", "S", "L" and "D". In this case, the pixels forming the teletext character are hatched and are called dot pixels. The pixels forming the background part of the teletext are called blank pixels.

In order to compress the above mentioned teletext data, respectively two adjacent rows of the vertical pixel rows are made a set of an odd number row and even number row and are divided into sets of $A_1$ and $B_1$, $A_2$ and $B_2$, $A_{12}$ and $B_{12}$. The respective sets of pixel rows are logically operated to be added to each other. The data obtained thereby are displayed as an auxiliary picture as a compressed output. In FIG. 3, in the picture after the compression, $C_1$, $C_2$, and $C_{12}$ correspond respectively to $A_1$ and $B_1$, $A_2$ and $B_2$, and $A_{12}$ and $B_{12}$.

Now, as shown in FIG. 4, there shall be considered the case that the outline of the teletext character is displayed by "blank pixels" and the background is displayed by the data representing "dot pixels". Now, if a logical addition operation preferring such dot data as are compressed in FIGS. 2 to 3 is used as a compressing method, as shown in FIG. 5A, in the picture compressed thereby, the original information will be greatly lost. That is to say, FIG. 4 is a picture (inversely displayed picture) in which the dot pixels and blank pixels are replaced with each other. When such teletext data are compressed by the same logical operation method as in FIG. 2, there will be made such picture in which the greater part of the original information has been lost as is shown in FIG. 5A.

On the contrary, if there is adopted a compressing method preferring blank pixels, that is, a method of subtracting the pixels by operating the respective logical products of $A_1$ and $B_1$, $A_2$ and $B_2$,... and $A_{12}$ and $B_{12}$ as shown in FIG. 5B, the information in FIG. 4 will become the same compressed picture substantially perfectly holding the original information as the picture in FIG. 3. However, if the data in FIG. 2 are compressed by the compressing method preferring the blank pixels, as shown in FIG. 6, there will be a contradiction that the original information will not be reproduced.

As mentioned above, in case the compressing rule is fixed, depending on the contents of the teletext data, the information has been properly compressed or has been lost.

SUMMARY OF THE INVENTION

Therefore, an object of the present invention is to provide a teletext information compressing technique whereby teletext information, even if compressed, will be able to be displayed without losing the original information.

That is to say, the first mode of the television receiver with a teletext receiving function according to the present invention is:

a television receiver with a teletext receiving function, comprising:

a signal receiving means for receiving television broadcast signals including teletext data;

a video signal pick-up means for picking up television video signals from the broadcast signals received by the above mentioned signal receiving means;

a displaying means for displaying the video signals picked up by the above mentioned video signal pick-up means;

a teletext data pick-up means for picking up the above mentioned teletext data from the above mentioned television broadcast signals;

a storing means for temporarily storing the teletext data from the above mentioned teletext data pick-up means;

a density judging means for dividing the teletext data for one picture from the above mentioned storing means into block data corresponding to picture blocks of a predetermined size and judging the density of the respective block data;

a plurality of compressing means different in the rule for compressing the block data divided by the above mentioned density judging means;

a compressing method selecting means for selecting any one of the above mentioned plurality of selecting means on the basis of the judging result of the above mentioned density judging means; and a display controlling means for displaying as a son picture the teletext data compressed by the compressing means selected by the above mentioned compressing method selecting means.

The second mode of the television receiver with a teletext receiving function according to the present invention is:

a television receiver with a teletext receiving function, comprising:

a signal receiving means for receiving television broadcast signals including teletext data;

a video signal pick-up means for picking up television video signals from the broadcast signals received by the above mentioned signal receiving means;

a displaying means for displaying the video signals picked up by the above mentioned video signal pick-up means;

a teletext data pick-up means for picking up the above mentioned teletext data from the above mentioned television broadcast signals;

storing means for temporarily storing the teletext data from the above mentioned teletext data pick-up means;

a density judging means for dividing the teletext data for one picture from the above mentioned storing means into block data corresponding to picture blocks of a predetermined size and judging the density of the respective blocks with the two block data adjacent in the horizontal direction among these block data as a unit;

a plurality of compressing means different in the rule for compressing the block data divided by the above mentioned density judging means;

a compressing method selecting means for selecting any one of the above mentioned plurality of selecting means on the basis of the judging result of the above mentioned density judging means; and a display controlling means for displaying as a son picture the teletext data compressed by the compressing means selected by the above mentioned compressing method selecting means.

The first mode of the method for superimposing a teletext picture on a television picture according to the present invention is:

a method for superimposing a teletext picture on a television picture, comprising:

a step of receiving television broadcast signals including teletext data;

a step of picking up television video signals from the above mentioned received broadcast signals;

a step of displaying the above mentioned picked up video signals;

a step of picking up the above mentioned teletext data from the above mentioned television broadcast signals;

a step of temporarily storing the above mentioned picked up teletext data;

a step of dividing the stored teletext data for one picture the block data corresponding to the picture blocks of a predetermined size and judging the density of the respective block data;

a step of selecting any one of a plurality of compressing means for compressing the above mentioned block data by different rules on the basis of the judgment of the above mentioned density judging step; and a step of displaying as a son picture the teletext data compressed by the selected compressing means.

The second mode of the method for superimposing a teletext picture on a television picture according to the present invention is:

a method for superimposing a teletext picture on a television picture, comprising:

a step of receiving television broadcast signals including teletext data;

a step of picking up television video signals from the above mentioned received broadcast signals;

a step of displaying the above mentioned picked up video signals;

a step of picking up the above mentioned teletext data from the above mentioned television broadcast signals;

a step of temporarily storing the above mentioned picked up teletext data;

a step of dividing the stored teletext data for one picture into the block data corresponding to the picture blocks of a predetermined size and judging the density of the respective blocks with the two blocks adjacent in the horizontal direction of these block data as a unit;

a step of selecting any one of the plurality of compressing means for compressing the above mentioned block data by different rules; and a step of displaying as an auxiliary picture the teletext data compressed by the selected compressing means.

BRIEF DESCRIPTION OF THE DRAWINGS

FIG. 13 is a view showing a density addition conversion table.

FIGS. 14 and 15 are explanatory views for explaining a method in the case of selecting a compressing means.

FIGS. 17A, 17B, 18A and 18B are views showing conversion tables.

DETAILED DESCRIPTION OF THE PREFERRED EMBODIMENTS

The present invention shall be described in detail in the following with reference to the accompanying drawings.

Figure 7:
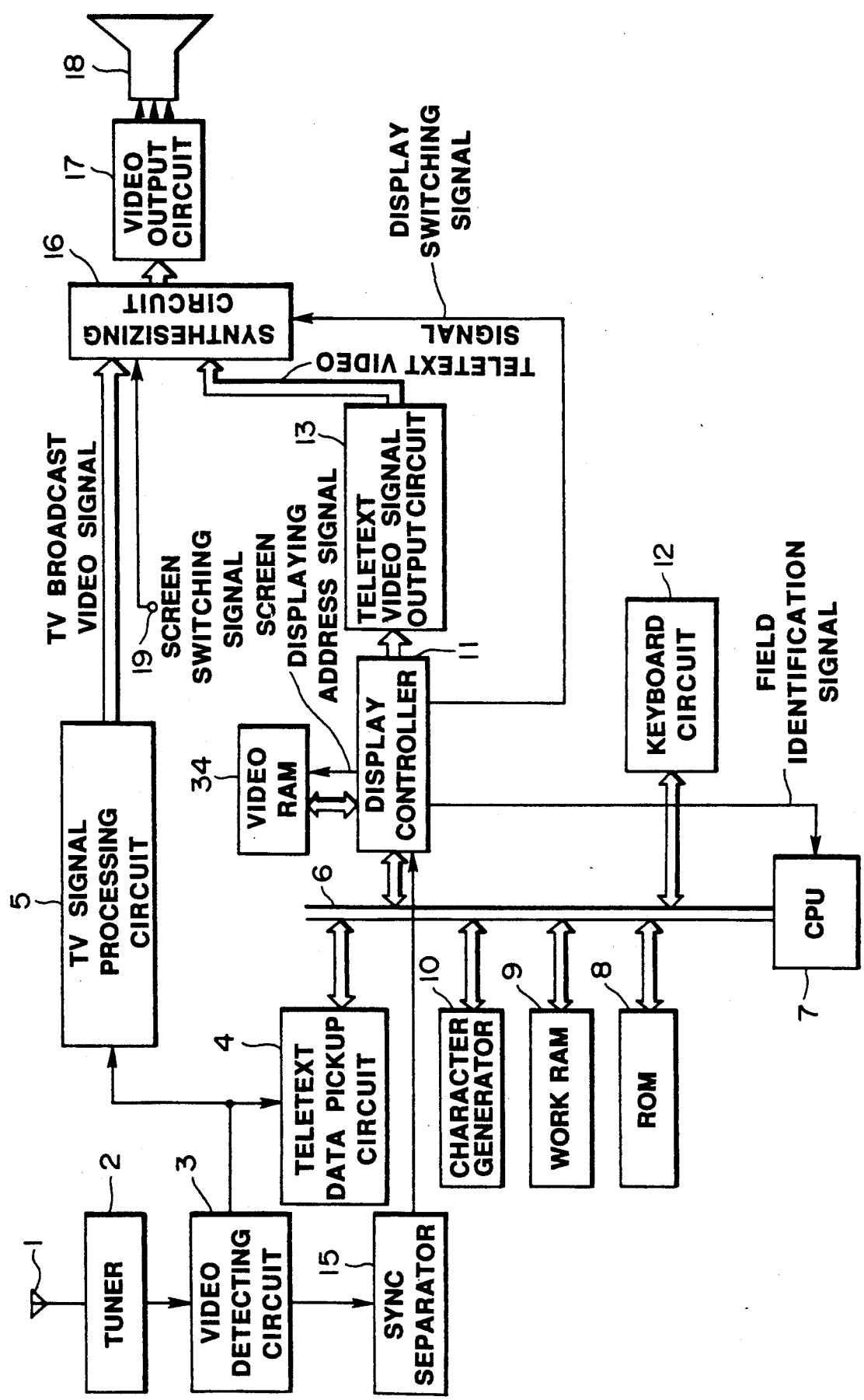
FIG. 7 is a formation view showing an embodiment of a television receiver with a teletext receiving function according to the present invention.

In a circuit shown in FIG. 7, a television (TV) broadcast signal superimposed with teletext data including a teletext program the user desires to view is received by a TV broadcast signal receiving antenna 1 and is tuned by a tuner 2. After being tuned, the TV broadcast signal is fed to a video detecting circuit 3 for the video detection. A demodulated video signal output from the video detecting circuit 3 is fed to a teletext data pick-up circuit 4 by which teletext data are picked up from the demodulated video signal in the order of the transmission. The demodulated video signal output from the video detecting circuit 3 is also fed to a TV signal processing circuit 5 of a well known type.

The teletext data pick-up circuit 4 comprises a buffer memory for temporarily storing the pick-up teletext data. The teletext data pick-up circuit 4 is connected to a microcomputer (referred to as a CPU hereinafter) 7 through a buss line 6. In addition to the teletext data pick-up circuit 4, the following are also connected to the CPU 7 through the bus line 6: an ROM 8 for storing a program for displaying the teletext data; work RAM 9; character generator 10 for generating characters on the basis of codes included in the teletext data; display controller 11; and keyboard circuit 12. The keyboard circuit 12 includes various kinds of key switches and generates a signal corresponding to an operated key switch. Needless to say, the keyboard circuit 12 may be replaced with a circuit which receives an operation signal transmitted by such key input means as a remote control hand set and generates a signal corresponding to the received operation signal.

The display controller 11 stores image data of characters successively generated by the character generator 10 into a video RAM 34. This RAM 34 is adapted to store teletext data. The display controller 11 also reads the teletext data out of the video RAM 34 and feeds them to a synchesizing circuit 16 through a teletext video signal output circuit 13. More particularly, the display controller 11 reads the teletext data by driving the video RAM 34 on the basis of a screen displaying address and transmits them to the synthesizing circuit 16. Further, the controller 11 transmits a display switching signal to the synthesizing circuit 16.

The teletext data signal fed from the display controller 11 and the signal fed from the TV signal processing circuit 5 are selectively output from the synthesizing circuit 16 in accordance with the display switching signal so that the signals may be synthesized with each other. The synthesized signal is fed to a video output circuit 17. This video output circuit 17 produces a video signal including auxiliary picture (i.e. teletext picture) information associated with the teletext data synthesized by the synthesizing circuit 16 and feeds it to a CRT 18. The display controller 11 prepares a teletext picture display clock by using a sync signal fed from a sync separator 15 employed to separate the sync signal from the video detection output of the video detecting circuit 3.

The operation of the above mentioned TV receiver shall now be described with reference to FIGS. 8 to 20 (in which the processes performed by the CPU 7 are explained).

Figure 8:
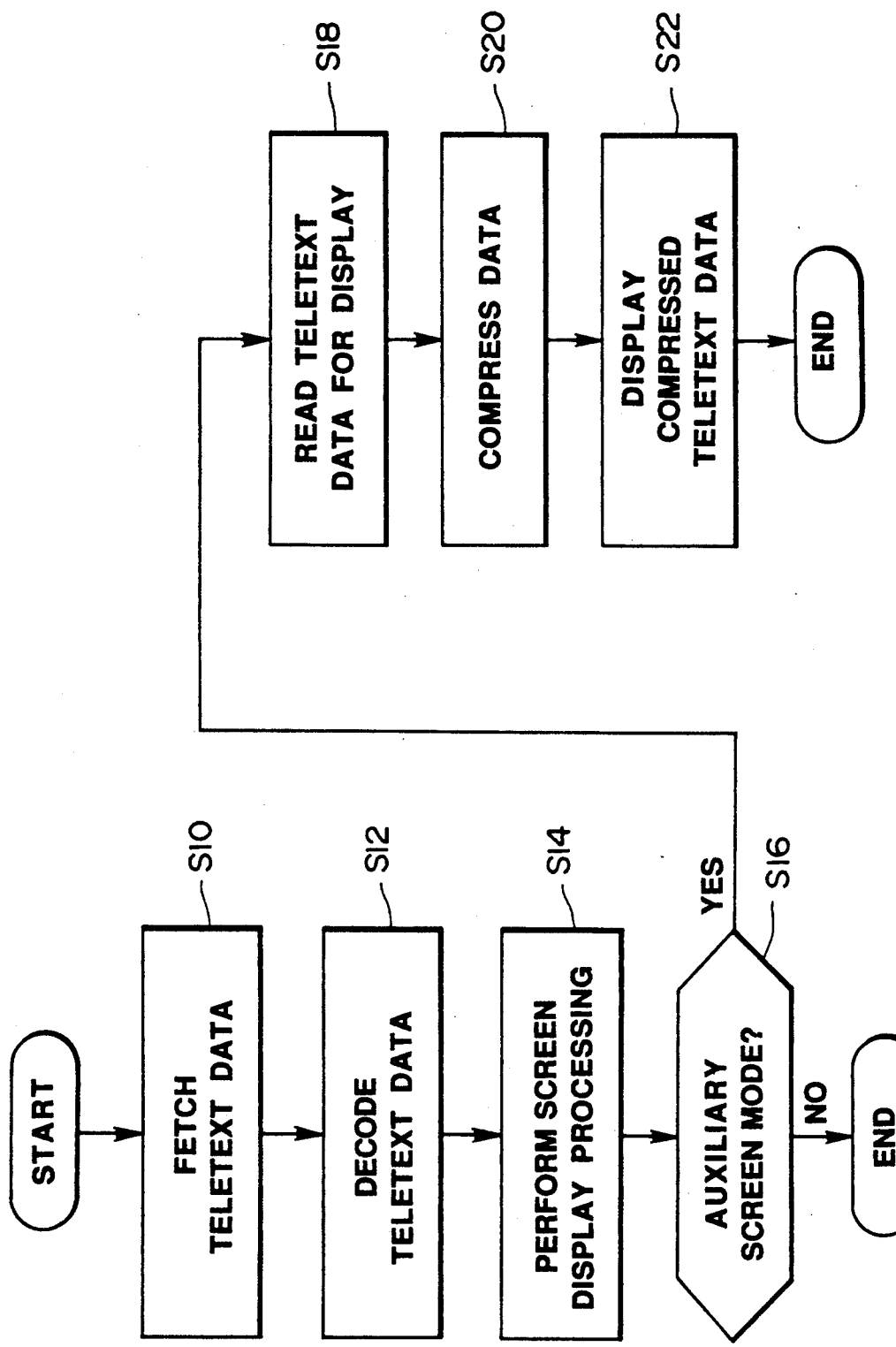
FIG. 8 is a flow chart showing a main routine of the present invention.

FIG. 8 shows a main routine of the CPU 7. First of all, the CPU 7 causes the teletext data pick-up circuit 4 to fetch the data of the teletext program corresponding to the program number data fed from the keyboard circuit 12 (step $S_{10}$). Specifically, the CPU 7 checks the data stored in the buffer memory by the teletext data pick-up circuit 4 on the basis of the program number data fed from the keyboard circuit 12 to search for the teletext data of the teletext program corresponding to the program number data. If the teletext data searched for are found, they will be decoded according to the program stored in the ROM 8 (step $S_{10}$). Specifically, the CPU 7 causes the character generator 10 to generate the characters corresponding to the fetched teletext data to thereby develop the teletext data into data adapted to be displayed.

Then, screen display processes are performed (step $S_{14}$). In the processes, the teletext data are transferred to the display controller 11 where they are written into the video RAM 34.

In the display controller 11, it is determined whether the TV receiver is to bee set in the auxiliary picture display mode (step $S_{16}$). If it is determined that the apparatus is not to be set in the auxiliary screen display mode, then the display controller 11 will feed a screen displaying address signal to the video RAM 34 as synchronized with a raster scan so as to feed the teletext data signal to the synchronizing circuit 16. At this time, the synchronizing circuit 16 will be set in the mode for selecting and outputting the teletext data since, during the normal display mode, the circuit 16 will receive a screen switching signal fed from the keyboard circuit 12 through a terminal 19. Therefore, the synchronizing circuit 16 will feed the teletext data signal to the video output circuit 17. As a result, the teletext program selected by the key operation at the keyboard circuit 12 will be displayed on the display screen of the CRT 18.

In case a TV broadcast signal is displayed, the screen switching signal fed to the terminal 19 will cause the synthesizing circuit 167 to select and output the TV broadcast signal fed from the TV signal processing circuit 5. Therefore, the synthesizing circuit 16 will feed the selected TV broadcast video signal to the screen of the CRT 18 through the video output circuit 17.

How the teletext data are displayed on the auxiliary display screen shall now be described. When a signal causing the teletext data to be displayed in the auxiliary display screen is fed to the CPU 7 from the keyboard circuit 12, the CPU 7 will decode these data to establish an auxiliary screen display mode. When the auxiliary screen display mode is set in the step $S_{16}$, the CPU 7 will perform the processes for reading the teletext data (step $S_{18}$). That is to say, the CPU 7 will feed a reading control signal too the display controller 11. Therefore, the display controller 11 will read the teletext data from the video RAM 34 and will transfer them into the work RAM 9.

After the teletext data are transferred into the work RAM 9, the CPU 7 will selectively delete the teletext data to compress the data (step $S_{20}$). In this manner, the teletext data are processed into data adapted to be displayed on the auxiliary display screen which is of a size ¼ or ⅛ that of the normal display screen.

After the compressed teletext data adapted to be displayed on the auxiliary display screen are prepared, the CPU 7 will perform processes for displaying the compressed teletext data (step $S_{22}$). Specifically, the compressed teletext data are transferred to the display controller 11 so as to be stored in the video RAM 34. Thereafter, the display controller 11 feeds the compressed teletext data signal from the video RAM 34 to the synthesizing circuit 16. At th is time, a display switching signal, i.e., a timing signal allowing the compressed teletext data signal to be displayed in accordance with the raster scan of the TV broadcast signal will be also fed to the synthesizing circuit 16. In this fashion, the teletext program (teletext picture) is displayed as auxiliary screen data together with the TV broadcast program (TV picture) displayed on the TV broadcast screen.

The compressing method shall be explained in the following.

Figure 2:
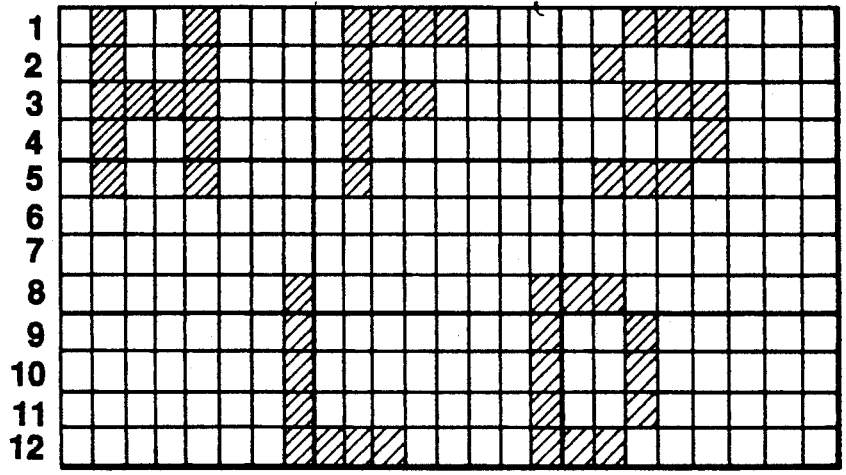
FIGS. 2 and 3 are picture views for explaining an example of a compressing method.
Figure 3:
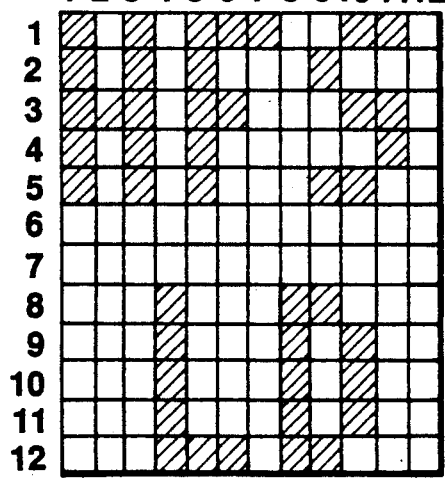
Figure 4:
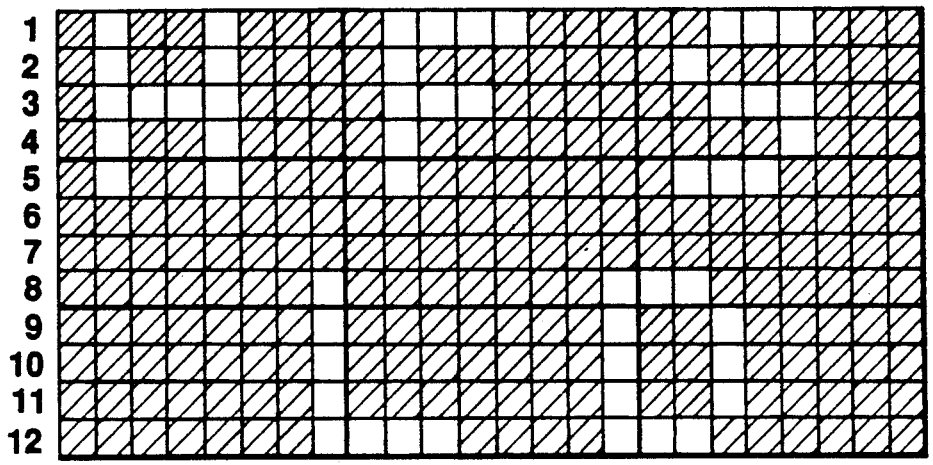
FIGS. 4, 5A and 5B are picture views showing another example of a compressing method.
Figure 5A:
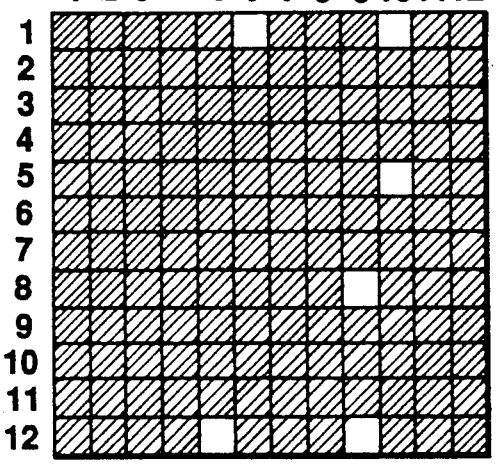
Figure 5B:
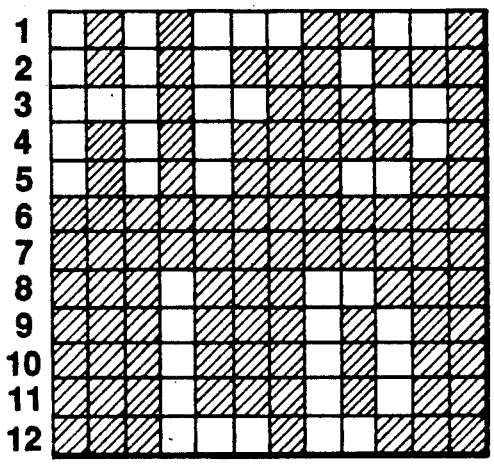
Figure 6:
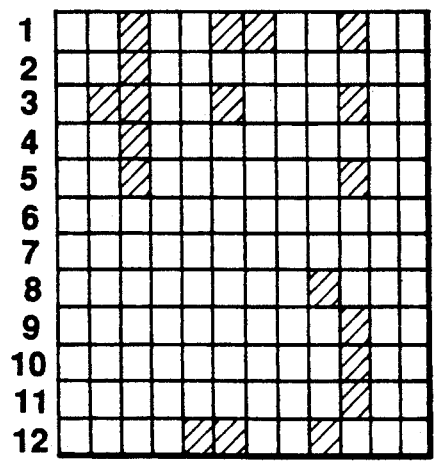
FIG. 6 is a compressed picture view of the picture in FIG. 2 as compressed by another compressing method mentioned above.

The compressing method according to this embodiment is to select in response to the picture information the compressing method from FIG. 2 to FIG. 3 (method of preferred dot pixels = logical sum) or the compressing method from FIG 4 to FIG. 5B (method of preferring blank pixels = logical product)).

Figure 9:
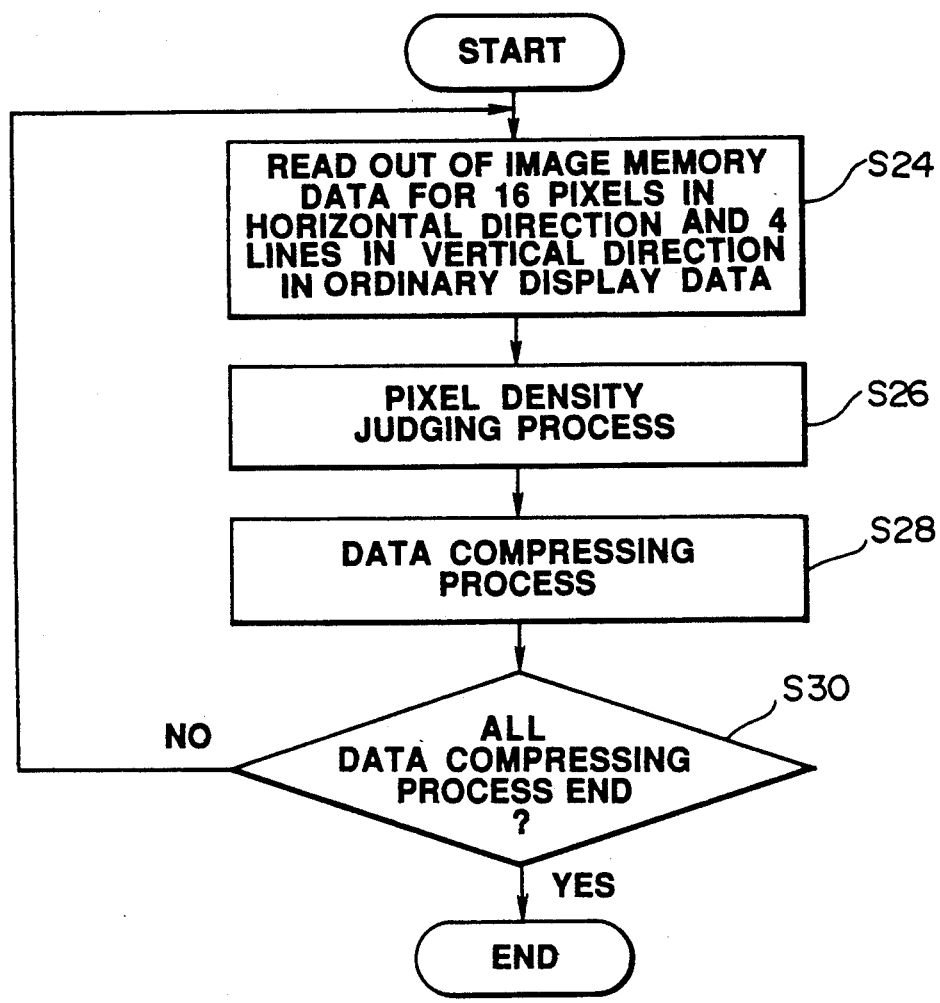
FIG. 9 is a flow chart showing a main routine in a compression program by the present invention.

FIG. 9 shows a routine off a compression process shown in the step S20 (FIG. 8). The flow chart of FIG. 9 comprises steps $S_{24}$ and $S_{26}$ of judging picture information, a step $S_{28}$ of compressing data from the result of the judgment and a step $S_{30}$ of judging whether the data compression for one picture has been completed.

First of all, the step S24 is a process for reading pixel data in the data of respective blocks of a predetermined size of a TV picture. In the case of such picture consisting of 24 pixels in the horizontal direction and 12 lines in the vertical direction as is shown, for example, in FIG. 2, the block size is of 8 pixels in the horizontal direction and 4 lines in the vertical direction (as sectioned with thick lines in FIG. 2 or 4). The pixel data reading work is a process of counting the dot pixels or blank pixels so that the pixel density may be known. In the step $S_{26}$, the values showing the pixel densities of the respective blocks found by the step $S_{24}$ are referred to, the compressing method to be taken in each block is judged and the result of the judgments is left to the next step $S_{28}$ as a selection criterion of the compressing method. In the step $S_{30}$, any compressing method is selected on the basis of the above mentioned judging criterion and the data are compressed.

Figure 10A:
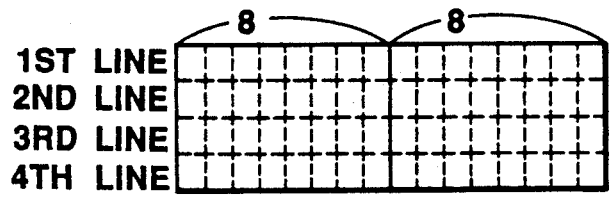
FIG. 10A is an explanatory view showing a block as not compressed.
Figure 10B:
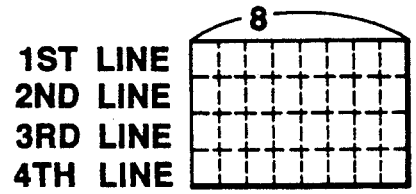
FIG. 10B is an explanatory view showing a block as compressed.
Figure 11:
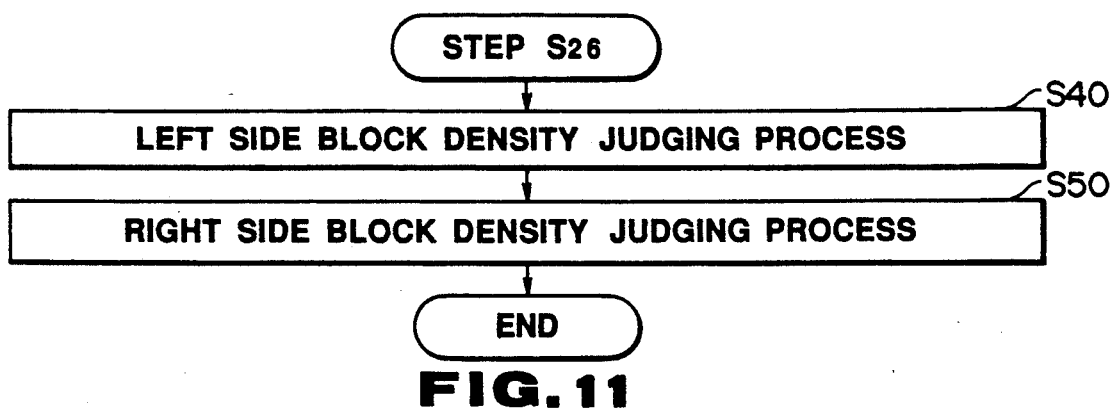
FIGS. 11, 12A and 12B are flow charts showing a density judging process.

In the case of this embodiment, the information of two blocks of 4 lines of 16 pixels in the horizontal direction (See FIG. 10A) is made a unit to judge the pixel density and is compressed to information of one block of four lines (See FIG. 10B). That is to say, as shown in FIG. 11, the pixel density judging step $S_{26}$ is carried out as divided into a step $S_{40}$ of judging the pixel density of the left side block and a step $S_{50}$ of judging the pixel density of the right side block.

Figure 12A:
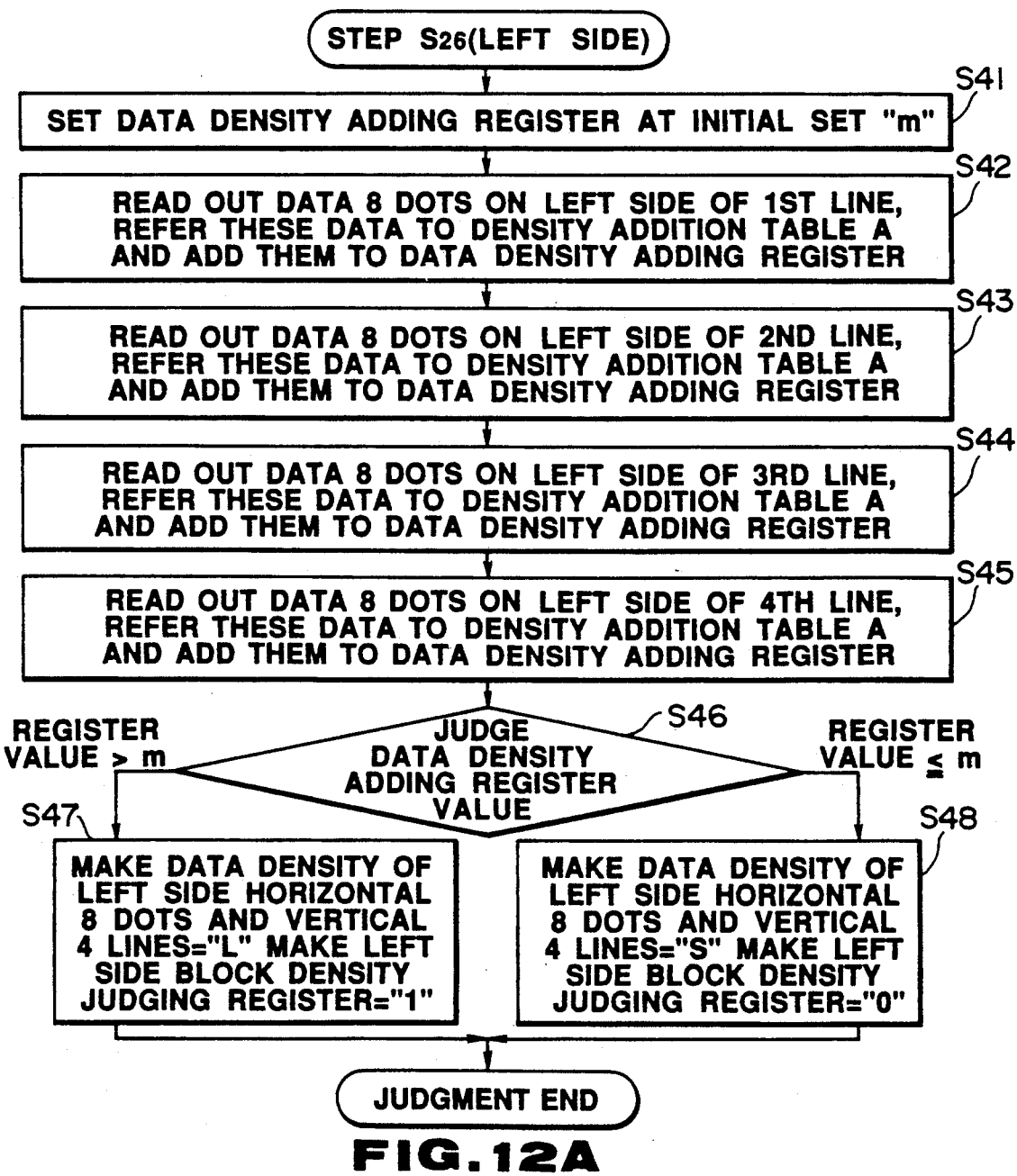

FIG. 12A shows a detailed flow chart of the step $S_{40}$. In judging the pixel density, the number of pixels of logical "1" n the data of 8 pixels in the horizontal direction (which shall be called horizontal direction data hereinafter)) may be counted but here is used a density adding conversion table in which are written the numerical values predetermined from the contents of the horizontal direction data. The conversion value obtained from the table is added to a density adding register showing the pixel density.

An example of the density addition conversion table is shown in FIG. 13. The written conversion values are determined by the grouping of the horizontal direction data, for example, by whether the number of the logical "1" is large or small. That is to say, the conversion value in which the upper 4 bits are "11" in the 16-progress expression and the conversion values of all the data in which the lower 4 bits are below "3" are $(-1)$ and the conversion values of all the data in which the upper 4 bits are "F" and the lower 4 bits are above "4" are made $(+1)$.

Now, in FIG. 12A, in a step $S_{41}$, the density adding register is initialized. The value of the initialized density adding register is made "m". Then, by a step $S_{42}$, the horizontal direction data of the first line of the left side block are picked up. The data picked up are referred to in the conversion table to read conversion values which are added to the density adding register. When the conversion values for the horizontal direction data of the first line have been added, sequentially by steps $S_{43}$, $S_{44}$ and $S_{45}$, the conversion values for the horizontal direction data of the second, third and fourth lines are added.

The value of the density adding register obtained in the step $S_{45}$ is judged by a step $S_{46}$ so that, in case the value of the density adding register is larger than the initial value "m", by a step $S_{48}$, the value of the left side block density judging register will be set at logical "1" showing, for example, a density "dense" and, in case the value of the density adding register is smaller than the initial value "m", by the step $S_{48}$, the value of the left side block density judging register will be set at logical "0" showing, for example, a density "rare".

Figure 12B:
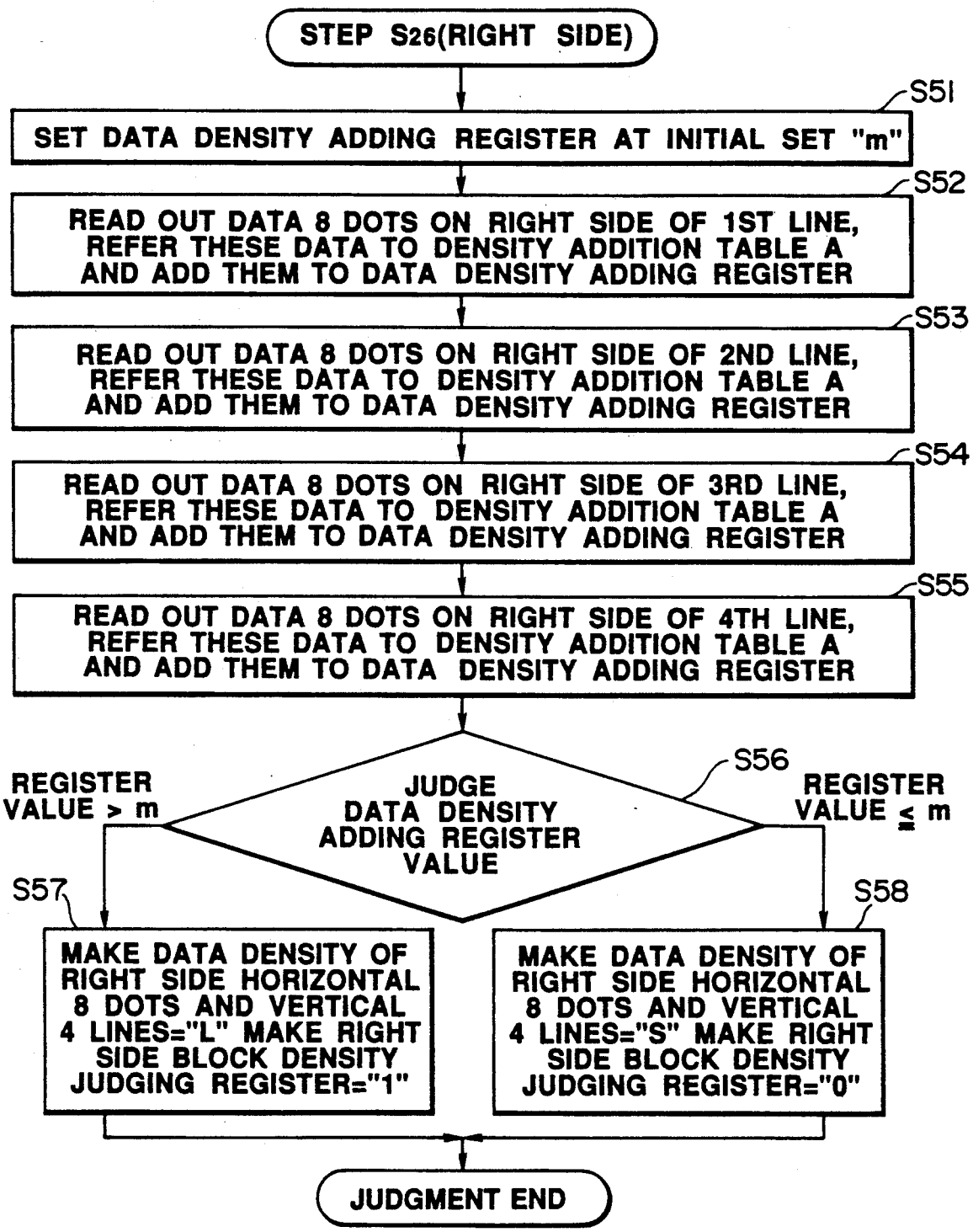

FIG. 12B is a flow chart showing in detail the right side block density judging process. In this case, too, by using the same density conversion table and density judging register as of the left side block, steps $S_{51}$ to $S_{56}$ corresponding respectively to the steps $S_{41}$ to $S_{46}$ will be processed. In the step $S_{56}$, when the register value shows "dense", by a step $S_{57}$, the value of the right side block density judging register will be set at logical "11" and, when the register value shows "rare", by the step $S_{57}$, the value of the right side block density judging register will be set at logical "0".

FIGS. 14 and 15 are explanatory views showing conceptionally an example of a density judging process. Such picture of 24 pixels in the horizontal direction and 12 lines in the vertical direction as is shown in FIGS. 2 and 3 as a picture before the compression is considered. When this picture is sectioned into blocks of 8 pixels in the horizontal direction and 4 lines in the vertical direction, 9 blocks in all will be obtained. When these blocks are represented by I to IX as illustrated and the values showing the densities of the respective blocks I to IX (the values of the density adding register) are determined, the number of pixels of dot data will be 10 pixels in the block I, 9 pixels in the block II, 8 pixels in the block III, 3 pixels in the block IV, 2 pixels in the block V, 5 pixels in the block VI, 4 pixels in the block VII, 7 pixels in the block VIII and 5 pixels in the block IX. In the case of the picture shown in FIG. 4, the number of pixels displaying dot data is 22 pixels in the block I, 23 pixels in the block II, 24 pixels in the block III, 29 pixels in the block IV, 30 pixels in the block V, 27 pixels in the block VI, 28 pixels in the block VII, 25 pixels in the block VIII and 27 pixels in the block IX. In order to judge the densities of the respective blocks, as the total sum of the pixels of the respective blocks is 32 pixels, the blocks in which the number of dot data is 322 to 16 are judged to be "dense" and the blocks of 15 too 0 are judged to be "rare".

The process of the step $S_{28}$ (FIG. 9) of compressing the teletext data by selecting the compressing method from the above mentioned density judging results shell be explained in detail in the following.

Figure 16:
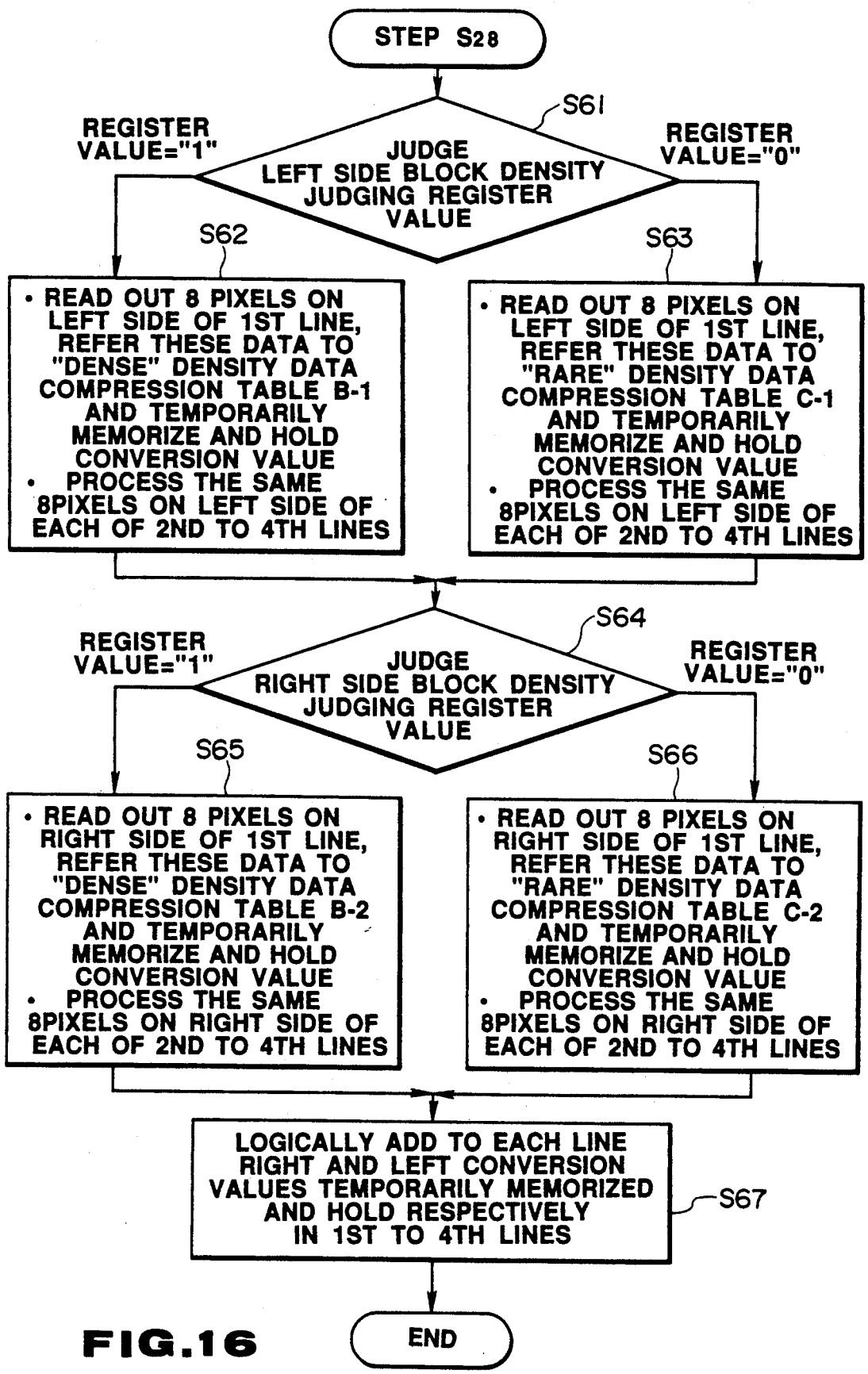
FIG. 16 is a flow chart showing a compressing process.

In FIG. 16, the steps $S_{16} \rightarrow S_{62}$ or steps $S_{61} \rightarrow S_{63}$ are for the compressing method selecting process for the left side block compression and the steps $S_{64} \rightarrow S_{65}$ or steps $S_{64} \rightarrow S_{66}$ for the compressing method selecting process for the right side block compression. These selecting processes are works of selecting one of a plurality of compression conversion tables. The compression conversion tables are different in the kind between the left side blocks and right side blocks and are also different depending on the density judging results. Therefore, four compression conversion tables are prepared.

That is to say, in the step $S_{61}$, in case the value of the left side density judging register is logical "1", a compression conversion table 21 shown in FIG. 17A will be used and, in case the value of the left side block density judging register is logical "0", a data compression conversion table 23 shown in FIG. 18A will be used. Also, in the step $S_{64}$, in case the value of the right side density judging register is logical "1", a compression conversion table 22 shown i FIG. 17B will be used and, in case the value of the right side density judging register is logical "0", a compression conversion table 24 shown in FIG. 18B will be used.

The respective "dense" density compression conversion tables 21 and 22 are prepared on the basis of a logical product operation preferring blank data. The "rare" density compression conversion tables 23 and 24 are prepared on the basis of a logical addition operation preferring dot data. However, the compression conversion values of the compression conversion tables are not to use the results of the logical product operation and logical addition operation as they are but, in consideration of errors generated in the density judging value judging boundary zone, the optimum values are determined by experiments and are written in. The compression data (compression conversion values) for the horizontal direction data from the blocks are written into the respective compression conversion tables 21 to 24. The compression conversion values are data of 8 bits corresponding to the horizontal direction data but any compression conversion value is "0" in the 16-progress number method in the upper four bits or lower four bits.

Now, in case the left side block judging result is "dense" and the right side block judging result is "dense", the table in FIG. 17A and the table in FIG. 17B will be selected or, in case the left side block judging result is "rare" and the right side block judging result is "rare", the table inn FIG. 18A and the table in FIG. 18B will be selected. In a step $S_{67}$, the values of logically adding the respective compression conversion values themselves from these tables are made compression data which are formed of 8 bits so that 16 bits for 2 blocks may be compressed to 8 bits for one block.

Figure 1:
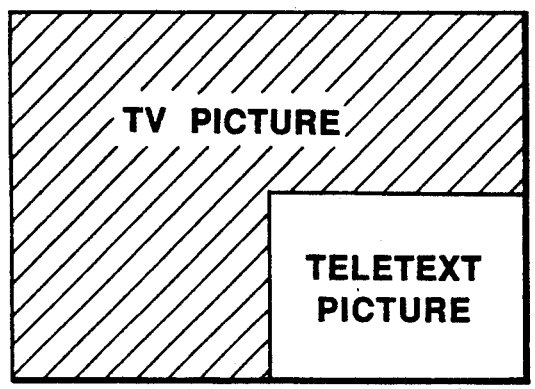
FIG. 1 is a picture view showing a teletext picture displaying example.
Figure 19A:
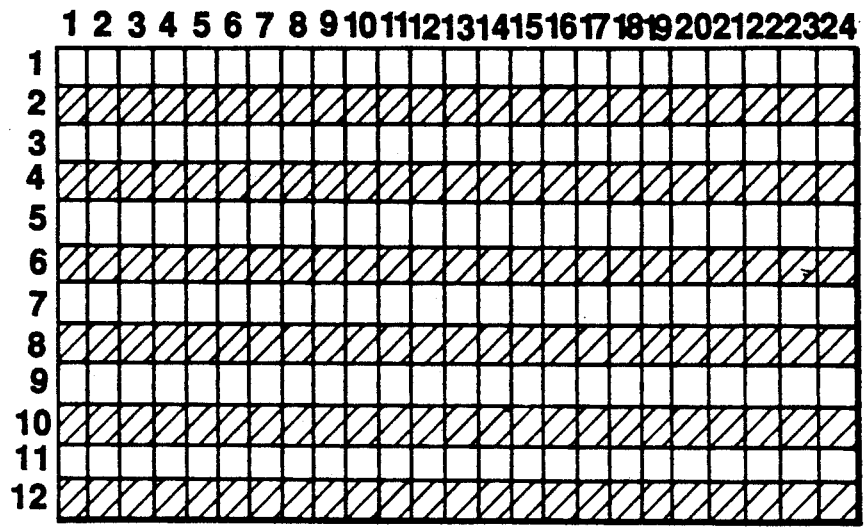
FIGS. 19A, 19B and 19C are explanatory views for explaining an example to further another compressing method.
Figure 19B:
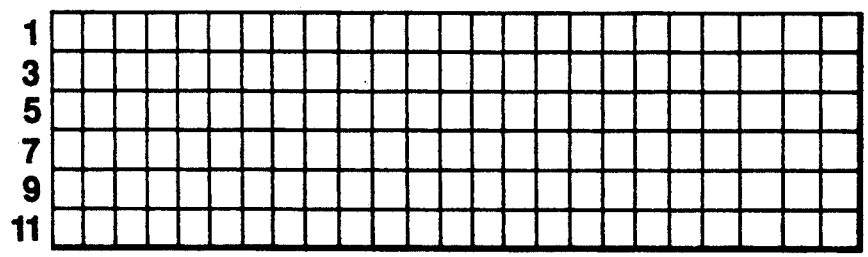
Figure 19C:
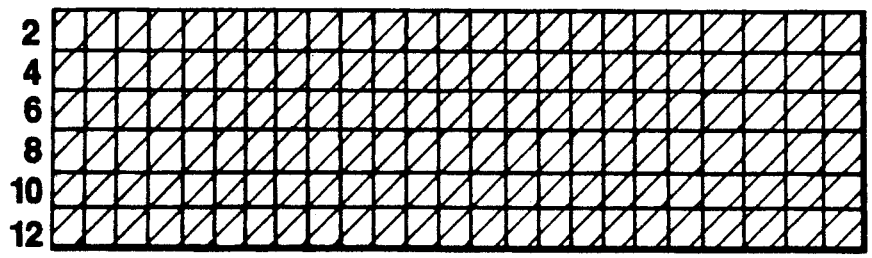

By the way, in order that the teletext data compressed as mentioned above may be compressed to such ¼ picture as is shown in FIG. 1, such compressing methods as are shown in FIGS. 19A to 19C are used together. FIGS. 19A to 19C show a compressing method displaying field pictures as alternately switched. That is to say, FIG. 19A shows a frame picture, FIG. 19B shows a picture of a first field and FIG. 19C shows a picture of a second field.

Figure 20:
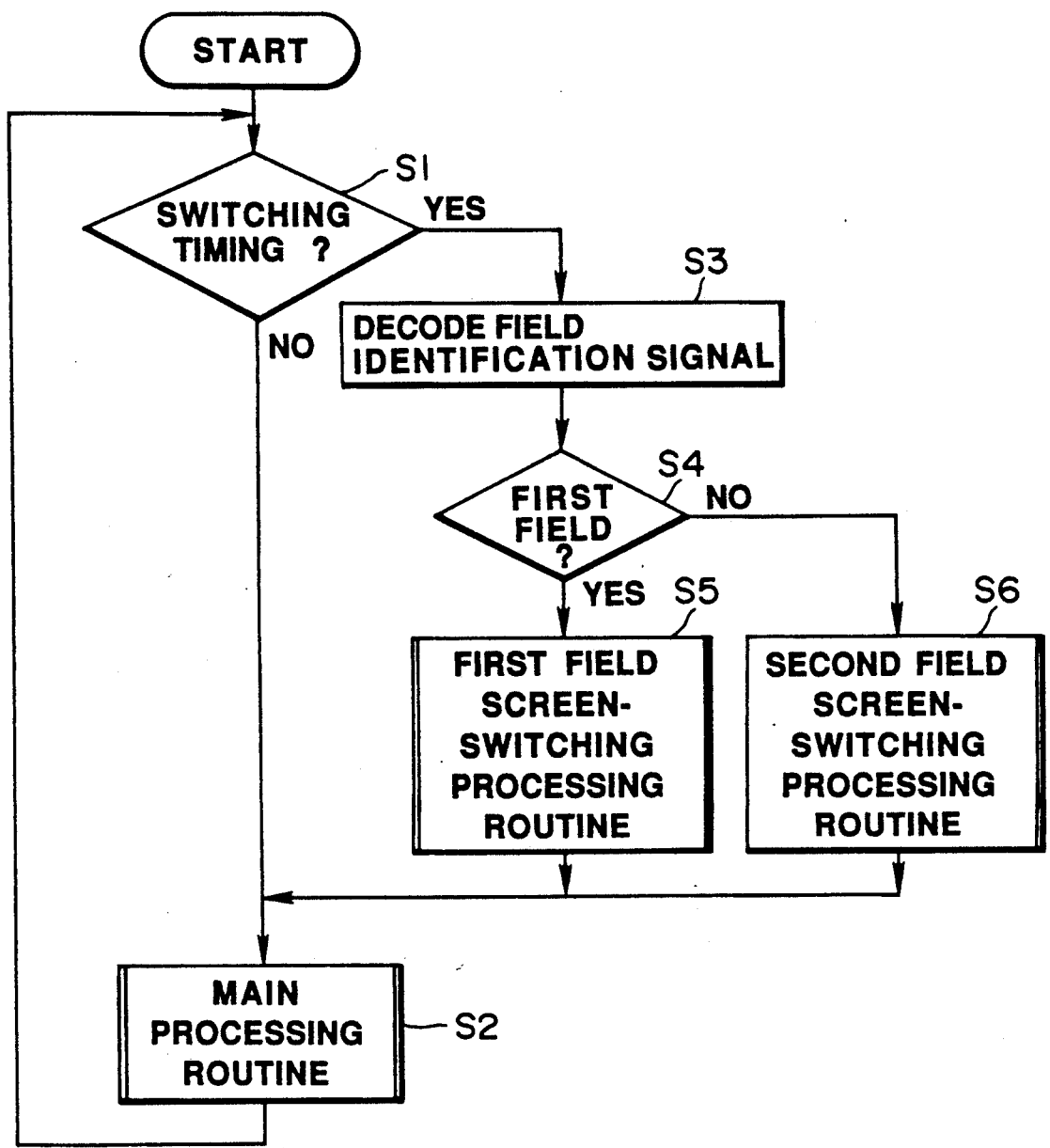
FIG. 20 is a flow chart of the compressing process shown in FIG. 19.

FIG. 20 shows a flow chart of the compression process explained in FIG. 19.

In FIG. 20, the step $S_1$ is of a process for judging a switching timing and detects a vertical synchronizing signal from the synchronizing separating circuit 15. While no vertical synchronizing signal is detected ("NO" in the step $S_1$), an ordinary displaying process (main routine $S_1 \rightarrow S_2$) will be made, teletext data will be stored in the image RAM 334 and done field part will be displayed as a auxiliary picture. When a vertical synchronizing signal is detected ("YES" in the step $S_1$), the display controller 11 will perform the step $S_3$ to have a field identification signal decoded by the CPU 7 which will judge the field by the above mentioned field identification signal (step $S_4$). In the step $S_4$, in the case of the first field, the display of FIG. 19B will be made (step $S_5$) and, in the case of the second field, the display of FIG. 19C will be made. After the above mentioned compression display, the main step $S_2$ will return and the switching timing will be again judged (step $S_1$).

As in the above, according to the present invention, teletext data can be compressed and displayed on a TV picture without substantially lacking information.

By the way, in the above mentioned embodiment, in the case of compressing divided blocks, two blocks adjacent in the horizontal direction are compressed as a unit but the density may be judged in each block which may be compressed as a unit.

What is claimed is:

1. A television receiver with a teletext receiving function, comprising:
   a signal receiving means for receiving television broadcast signals including teletext data;
   a video detecting means for detecting video signals from the signals received by said signal receiving means;
   a displaying means for displaying the video signals detected by said video detecting means;
   a teletext data pick-up means for picking up said teletext data from said detected video signals;
   a storing means for temporarily storing the teletext data from said teletext data pick-up means;
   a density judging means for dividing the teletext data for one picture from said storing means into block data corresponding to picture blocks of a predetermined size and judging the densities of the respective blocks;
   a plurality of compressing means different in the rule for compressing the block data divided by said density judging means;
   a compressing method selecting means for selecting any one of said plurality of compressing means on the basis of the judging result of said density judging means; and
   a display controlling means for displaying as an auxiliary picture the teletext data compressed by the compressing means selected by said compressing method selecting means.

2. A television receiver according to claim 1 characterized in that said plurality of compressing means have a plurality of means for compressing the respective block data divided by said density judging means so as to be contracted in the horizontal direction size of the picture and one means for compressing the same so as to be contracted in the vertical direction size of the picture.

3. A television receiver according to claim 2 wherein said horizontal direction compressing means comprises
   a first compressing means for outputting as a logical addition the data of respective two pixels adjacent in the horizontal direction among said block data, and
   a second compressing means for outputting as a logical product the data of said respective two pixels adjacent in the horizontal direction among said block data.

4. A television receiver according to claim 1 characterized in that said density judging means comprises a counting means for totaling the number of the dot data or blank data among said block data and a judging means for judging the density of the respective blocks from the count value set by said counting means.

5. A television receiver according to claim 2 wherein said block data comprises the data of the first field and the data of the second field, and
   said vertical direction compressing means includes means for outputting one of said data of the first field and said data of the second field among said block data.

6. A television receiver according to claim 2 wherein said block data comprises the data of the first field and the data of the second field and in that said means for compressing the data so as to contract the vertical direction size of said picture is a means for alternately outputting said data of the first field and said data of the second field in each field.

7. A television receiver with a teletext receiving function, comprising:
   a signal receiving means for receiving television broadcast signals including teletext data;
   a video detecting means for detecting video signals from the signals received by said signal receiving means;
   a displaying means for displaying the video signals detected by said video signal detecting means;
   a teletext data pick-up means for picking up said teletext data from aid detected video signals;
   a storing means for temporarily storing the teletext data from said a teletext data pick-up means;
   a density judging means for dividing the teletext data for one picture from said storing means into block data corresponding to picture blocks of a predetermined size and judging the densities of the respective blocks with the two block data adjacent in the horizontal direction among said block data as a unit;
   a plurality of compressing means different in the rule for compressing the block data divided by said density judging means;
   a compressing method selecting means for selecting any one of said plurality of compressing means on the basis of the judging result of said density judging means; and
   a display controlling means for displaying as an auxiliary picture the teletext data compressed by the compressing means selected by said compressing method selecting means.

8. A method for superimposing a teletext picture on a television picture, comprising the steps of:
   receiving television broadcast signals including teletext data;
   detecting video signals from said received signals;
   displaying the video signals detected by said detecting step;
   extracting said teletext data from said detected video signals;
   temporarily storing said extracted teletext data;
   dividing the stored teletext data for one picture into the block data corresponding to the picture blocks of a predetermined size and judging the density of the respective blocks;
   selecting any one of a plurality of compressing steps for compressing said block data by different rules on the basis of judgment of said density judging steps; and
   displaying as an auxiliary picture the teletext data compressed by the selected compressing step.

9. A method according to claim 8, wherein said selecting step includes
   selecting a first compressing step for determining the logical product of the data of respective two pixels adjacent in the horizontal direction among said block data in case the judging result in the step of judging the densities of said respective blocks is "rare", and
   selecting a second compressing step for determining the logical addition of the data of respective two pixels adjacent in the horizontal direction among said block data in case said judging result is "dense".

10. A method for superimposing a teletext picture on a television picture, comprising the steps of:
    receiving television broadcast signals including teletext data
    detecting video signals from said received signals;
    displaying the video signals detected by said detecting step;
    extracting said teletext data from said detected video signals;
    temporarily storing said extracted teletext data;
    dividing the stored teletext data for one picture into block data corresponding to picture blocks of a predetermined size and judging the densities of the respective blocks with the two blocks adjacent in the horizontal direction of each of said respective block as a unit;
    selecting any one of a plurality of compressing means for compressing said block data by different rules; and
    displaying as an auxiliary picture the teletext data compressed by the selected compressing means.

* * * * *